Patented Apr. 12, 1927.

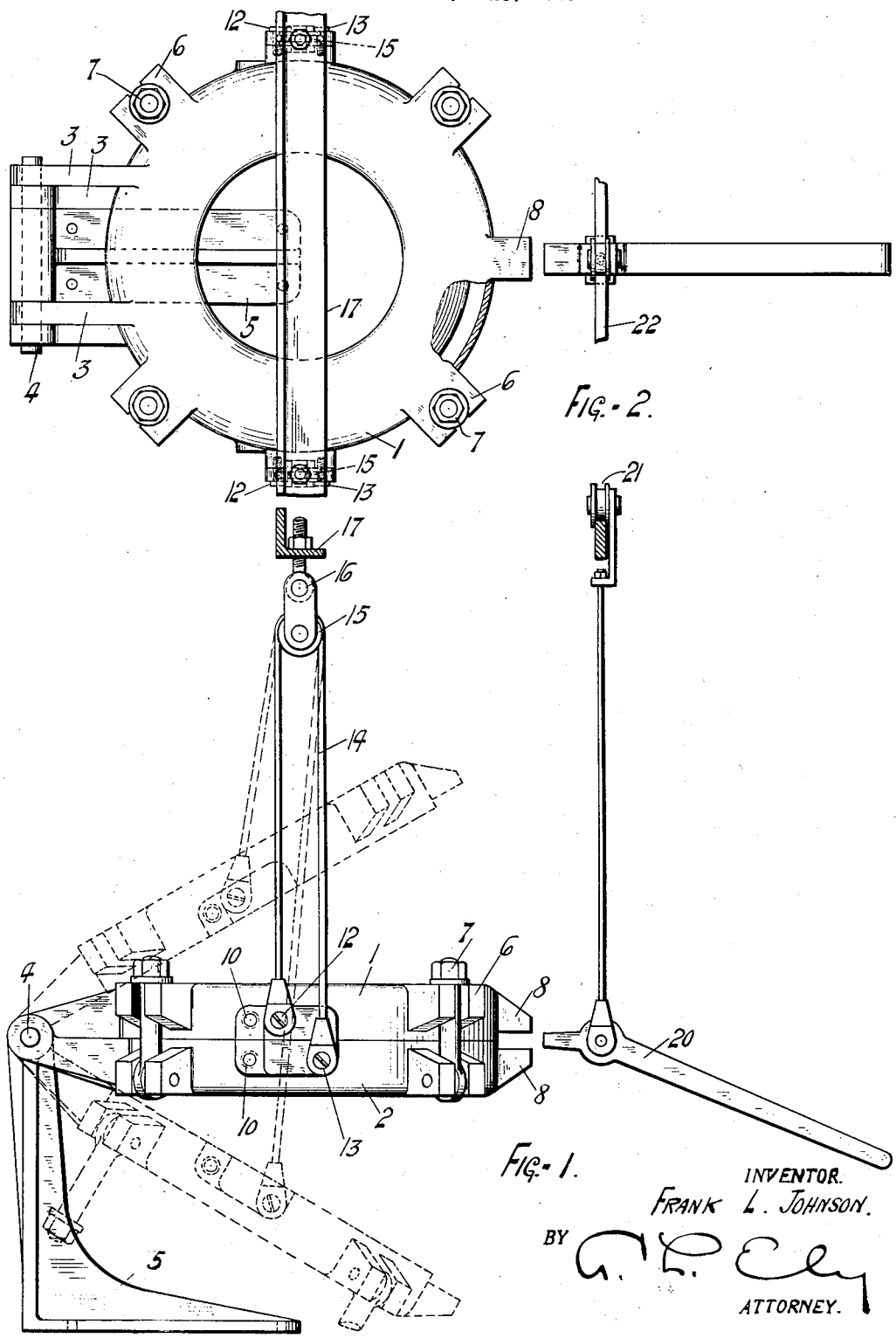

1,624,343

UNITED STATES PATENT OFFICE.

FRANK L. JOHNSON, OF AKRON, OHIO.

MOLD CONSTRUCTION.

Application filed September 23, 1925. Serial No. 58,072.

This invention relates to individual molds for use in the vulcanization of rubber articles such as tires or the like, and particularly to single molds of the chambered or jacketed type, the object of the invention being to provide a compact, economical and easily operated mold for this purpose.

In the manufacture of tires, and particularly tires for automobiles, the recent tendency of manufacturing establishments has been toward the provision of individual molds which are chambered or steam jacketed and which are used for the cure of single tires. This trend has been due to the fact that such molds are more economical to operate, require less labor and equipment to handle and admit of the manufacture of a large variety of sizes more efficiently than with the use of large vulcanizers or presses.

The object of the present invention is to construct and design molds of this type so that they can be opened and closed easily and so that a minimum of floor space will be required. One of the chief advantages of the present invention lies in the fact that the molds are combined with a simple and effective operating device so that the two halves or sections of a single mold counterbalance one another. When the molds are opened and closed, the work of the operator is greatly relieved and the molds may be opened, filled and closed quickly and easily, thereby securing a higher efficiency.

The device, as illustrated, consists of a single mold, the upper and lower sections of the mold being hinged together, in combination with an overhead cable and pulley arrangement by which the entire mold is suspended and the weight of one section is counterbalanced by the other. It will be apparent, however, that the invention may also be extended to other arrangements than a hinged construction, and it is also apparent that other means may be provided for securing simultaneous movement of the two sections of the mold. The invention, also, is not limited to the manufacture of pneumatic tires or vehicle tires, but may be used in the vulcanization of other articles.

In the drawing, in which the preferred embodiment of the invention is shown,

Figure 1 is a side elevation of the device; and

Figure 2 is a plan view thereof.

In the drawings, the numerals 1 and 2 represent the two sections or halves of a pneumatic automobile tire mold, 1 being the upper half and 2 the lower half. These mold sections are hollowed or chambered for the circulation of steam to effect vulcanization, suitable inlets for the steam and drains being provided, the steam inlets being indicated at 10. These molds are also formed with the required cavities in which the tire, curing rings and air bags are received, as is well understood by those familiar with the art.

The two mold sections are provided with parallel arms 3 through which passes the hinge pin 4 so that the mold sections are connected together at this point, the pin 4 serving as a pivot for the mold sections upon any suitable standard or bracket 5. The mold sections are provided with mating lugs or ears 6 with which are engaged the pivoted bolts 7 for the purpose of clamping the mold sections together. Lugs 8 may be cast on the mold sections opposite the hinge by means of which the molds may be pried apart.

For the purpose of interconnecting the two mold sections, there are provided upon each section 1, at opposite sides of the mold, supporting pins 12 and on the sections 2 are provided the supporting pins 13, and to each pair of pins 12 and 13 are connected the ends of a cable 14, which passes over a pulley 15, two of these cables and pulleys being arranged as shown, at either side of the mold, and supported from adjustable hangers 16 which are secured to the transverse beam 17.

The lower mold section 2 is somewhat heavier than the upper section 1, due to the weight of the bolts, tire and curing rings, and for this reason the pins 13 are spaced at a greater distance from the pivot 4 than are the pins 12, and while it may be difficult to secure an exact balance between the mold sections, the arrangement shown will accomplish an approximate balance between the sections.

The operation and advantages of the device will be apparent without further description. The molds may be very conveniently arranged in rows or batteries, in which case the lever 20 used for prying the molds apart may be suspended from a trolley 21 riding upon a rail 22 over the battery of molds.

Modifications and changes may be resorted to in the practice of the invention, it being understood that such as come within the scope of the present invention are intended to be covered herein.

What is claimed is:

1. A mold for the vulcanization of tires, comprising upper and lower chambered mold sections, a horizontal hinge for said sections, and means to interconnect the sections so that they will move in unison and the weight of the lower section will be opposed by the weight of the upper section.

2. A tire mold comprising upper and lower mold sections, a horizontal hinge forming a pivot for the sections, in combination with an overhead pulley, and a cable passing over the pulley and connected at its ends to the two sections, the point of connection for the upper half being closer to the pivot than the point of connection for the lower half.

3. A mold comprising two sections, a hinged connection for said sections, and means whereby the mold sections are suspended and counterbalanced by one another.

4. A mold comprising an upper and a lower section, a hinge pin for connecting the sections, a cable, and an overhead pulley for the cable, the cable being connected to the sections whereby they are suspended and counterbalanced.

FRANK L. JOHNSON.